US011910096B1

(12) United States Patent
Barker et al.

(10) Patent No.: US 11,910,096 B1
(45) Date of Patent: Feb. 20, 2024

(54) EXPOSURE OPTIMIZATION FOR DIGITAL BURST LIGHT

(71) Applicant: Light & Motion Industries, Marina, CA (US)

(72) Inventors: Geoffrey Barker, Seattle, WA (US); Daniel T. Emerson, Carmel, CA (US); David W. Tolan, Carmel, CA (US); Brooks P. Lame, Seaside, CA (US)

(73) Assignee: Light & Motion Industries, Marina, CA (US)

( * ) Notice: Subject to any disclaimer, the term of this patent is extended or adjusted under 35 U.S.C. 154(b) by 126 days.

(21) Appl. No.: 17/697,780

(22) Filed: Mar. 17, 2022

Related U.S. Application Data

(60) Provisional application No. 63/162,312, filed on Mar. 17, 2021.

(51) Int. Cl.
*H04N 23/72* (2023.01)
*H04N 23/56* (2023.01)
*H04N 23/74* (2023.01)

(52) U.S. Cl.
CPC ............. *H04N 23/72* (2023.01); *H04N 23/56* (2023.01); *H04N 23/74* (2023.01)

(58) Field of Classification Search
CPC .............................. H04N 23/56; H04N 23/74
See application file for complete search history.

(56) References Cited

U.S. PATENT DOCUMENTS

| 10,996,543 | B2 | 5/2021 | Tolan et al. | |
|---|---|---|---|---|
| 2012/0044374 | A1* | 2/2012 | Pohlert | H04N 23/56 348/370 |
| 2012/0140088 | A1* | 6/2012 | Clark | H04N 23/74 348/E5.037 |

* cited by examiner

*Primary Examiner* — Twyler L Haskins
*Assistant Examiner* — Angel L Garces-Rivera
(74) *Attorney, Agent, or Firm* — Thomas M. Freiburger

(57) ABSTRACT

A camera and LED strobe unit are operated such that the strobe unit produces a series of bursts, such as approximately ten per second. The bursts are used either to illuminate a subject at a series of different light levels, to then present a series of images to the user to select the best exposure, or to produce a series of images of a moving subject within a single frame. The light unit has a continuous mode of LED light output, but can be switched to the burst mode for high power bursts in rapid succession.

13 Claims, 5 Drawing Sheets

EXPOSURE OPTIMIZATION FOR DIGITAL BURST LIGHT

Priority benefit from provisional application Ser. No. 63/162,312, filed Mar. 17, 2021, is claimed.

BACKGROUND AND SUMMARY OF THE INVENTION

Flash photography has been around for a long time. Flashes are based on flash tubes that contain a gas that is ignited, creating a high power burst of light whose duration is in the range of $1/8000$ of a second. The ignition requires a very high voltage to ignite the gas. The high voltage is achieved using a capacitor or bank of capacitors that are charged in between flashes. The charging of the capacitor takes a second or more, which by camera standards, is quite slow. Fast charging can be delivered with far more expensive power supplies which are heavy and not accessible to general photographers.

Modern mirrorless cameras can shoot up to 30 frames a second which make analog strobes very slow in comparison. The ideal lighting solution for a photographer would be able to fire bursts of high intensity light in synchronization with the shutter speed of the camera.

Just firing at the same rate as the camera shutter would be a significant step forward. Additionally, a photographer who is not deeply practiced in the art may not be able to quickly identify the right camera settings to complement the flash or the right flash power for the desired camera shutter speed and exposure or F-stop. The wrong light power can lead to underexposed or overexposed images. Lacking experience, there are tools such as TTL developed for flash photography that send a short low power test shot before the actual flash. The camera uses this burst to automatically set the correct exposure before taking the shot. Typically in TTL, the flash sends out a $1/32$ power preflash that hits the subject and reflects back to the camera through the lens (TTL). The camera sees the preflash and determines how much light the subject needs based on the preflash. The camera turns the power of the flash up or down to expose the subject based on what it read through the lens. Then the shutter opens, the flash fires at the level the camera determined earlier and the image is recorded. The downside of this system is the user has no control over the settings and TTL does not always account for the type of effect the photographer desires. Other flash devices simply fire the light at full power but read the reflection from the subject and shut themselves off when adequate light is sensed. The flash time is in ten-thousandths of a second, much shorter than the duration of shutter opening. These flashes are analog, not digital.

The current invention enables the photographer to execute a series of rapid images, all taken in less than a second using a high power digital burst light as described in U.S. Pat. No. 10,996,543, owned by the assignee of the current invention and incorporated herein by reference in regard to the described continuous burst/LED light. In one mode of the invention, when the light device is set in OE mode (optimal exposure) the photographer presses the shutter and the camera takes a series of 10 photographs, each lit with a different level of light from the flash. The user then scrolls through the images and selects the optimal one. This light burst power is then set for the next image or images.

In the initial rapid imagery, if shooting at 10 frames a second, for example, the flash power will advance in 10% increments of full power allowing the full range of lighting power to light the images in a second or less. The light settings are captured with each image through communication with the camera. If image 4 is selected, the light is signalled to record the 4th increment light pulse power for the next image or images.

There can be a number of variations on this basic concept such as a version of the firmware that varies the duration of the light burst instead of the power. Changing the duration is useful when the scene to be captured is generally a low light area such as a bar where folks are dancing in the foreground. The photographer would like to capture details of the bar backdrop (usually little or no movement) which calls for a long exposure. But in order to light the dancers to make them come alive in the shot and freeze their motion, the duration of the light pulse needs to be short to stop the action. The photographer sets a slow shutter speed to allow enough light into the sensor to see the details of the backdrop while allowing the light burst to stop the action and light the dancers in the foreground. An appropriate F-stop for the background, with the slow shutter speed, is selected automatically or manually. In this example the procedure can be done, if desired, after performing the above procedure to determine optimal light level or burst duration.

Note that the stop-action imaging just described can also be done by selecting correct light burst power level rather than duration, the level being appropriate for the F-stop (lens opening).

A further variation is when a photographer wants to capture in a single frame a series of frozen or slightly dragged images such as a runner accelerating out of the starting blocks. For this effect, the camera shutter is held open long enough to allow the runner to leave the blocks and take a few steps. The long exposure (with appropriate lens opening) correctly exposes the background. The light is set to fire multiple times while the shutter is held open. The light effectively freezes the runner in a series of motions captured in a single image.

What makes digital lighting unique compared to conventional flash or strobes is that the duration of the gas ignition in the conventional flash tube cannot accurately be controlled. A digital light source on the other hand can vary the light duration. Either by varying the power up to some upper limit or by varying the duration of the light pulse, different effects can be achieved and the ideal lighting settings revealed for the user.

Note that the light can include a feedback light sensor, reading light on the subject in real time, to shut off the burst when sufficient light on the source is sensed. Such feedback sensor and controls have been known in previous flashes or strobes, and a sensor and its feedback can be incorporated in the circuitry of the LED light source.

This digital light source, described in the applicant's U.S. Pat. No. 10,996,543, incorporated by reference in its entirety herein, has the ability to run in either continuous light output or flip to higher burst power. The high-power burst is achieved by a scaling network controlling feedback to current sensing elements. This multi-mode capability allows the photographer to light a scene in continuous mode and see the light in real time in the image sensor. The photographer can adjust the light to a preferred level with the particular settings of the camera and then trigger a photo. The digital light source responds to the shutter action by delivering a burst of light that replaces the continuous light at (for example) double the power or one F-stop higher setting. The light source of the patent is capable of firing at least five bursts per second, more preferably ten bursts or more per second at a high power level at least double the continuous light power level.

The invention therefore provides a digital light source for photography that allows the user to select the best lighting effect by incrementing the power of the light source from low to high over about ten or more images taken with bursts of light in rapid succession. The user then selects the best image of that succession, and that light setting is recalled for the next shot.

As described above, a particular important aspect of the digital light source operation of the invention is the option of duration control such that for a set background exposure, the light source fires in rapid succession a series of sequential shots in which the flash duration (rather than power level) is varied across a range selected by the user or defaults to a preset range. The user can then scroll through the images and select the preferred image. Light duration setting for that image can be recalled for the next shot or shots.

The invention includes firmware allowing the user to manually set both light pulse duration and/or power. The control is set either remotely over a wireless connection or directly on the light device or through a wired connection to the light. The firmware preferably records the user-selected image and informs the light, either wirelessly or through a wired connection, which light setting the user has selected, and sets that power and duration for the next shot or series of shots. A wireless trigger can be used, connected onto the camera's "hot shoe", for wireless connection to and from the light device.

Further, the firmware of the invention allows the photographer to set a long exposure, as explained above, and tells the light to fire multiple bursts at some set interval across the duration of the shutter opening. This can produce multiple images of a moving subject in a single frame. The light power and duration are selected by the user, or could be automatically selected.

The invention is embodied in operation of a digital light source having both the ability to run continuously and when desired to fire at a higher-power pulse at many times per second. The light source can light continuously, or toggle to light burst mode at some multiple of the continuous power set by the user or embedded in the light that preferably would be a selected increment of F-stops, making it easier for the user to anticipate the right setting to use once satisfied with an image the user observes under the continuous light setting.

DESCRIPTION OF PREFERRED EMBODIMENTS

Figure 1:
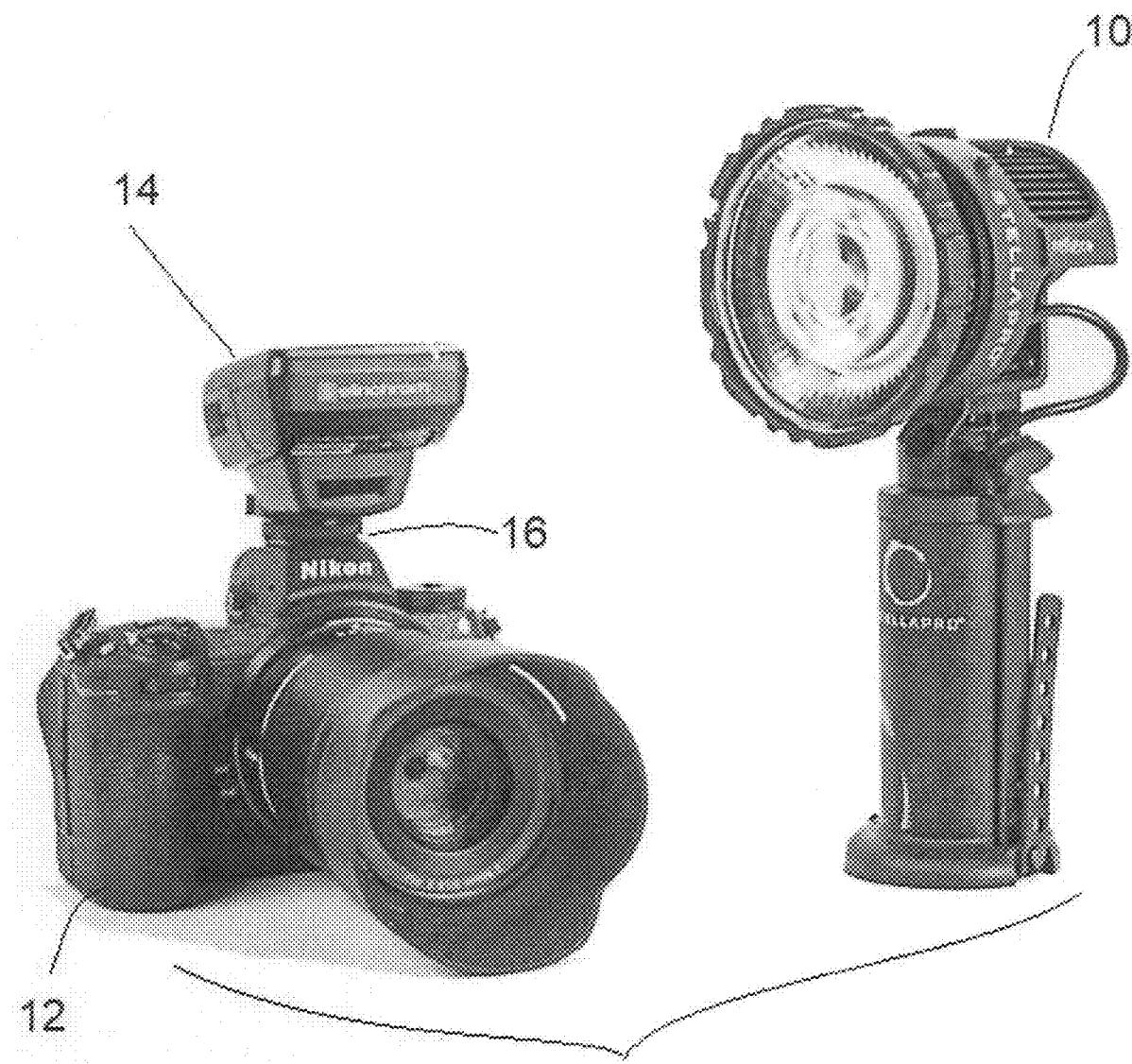
FIG. 1 is a perspective view showing a camera and light source of the invention.

FIG. 1 shows a light source 10 according to the invention, along with a digital camera 12 used in combination with the light source. The camera is shown with a wireless trigger device 14 secured to the hot shoe 16 of the camera, such hot shoe being designed for triggering a flash. The wireless trigger sends signals to the light source 10, which can be by RF or Bluetooth, and can receive signals back from the light source if needed in some operations.

The light source 10 preferably is as described in U.S. Pat. No. 10,996,543. As described in that patent, the LED light source 10 has a continuous power mode, or a selectable burst mode wherein the power level of each burst is a multiple, such as two times to four times, the continuous light level. The LED light source can fire at ten bursts per second or more, at a power level at least two times continuous level.

Figure 2:
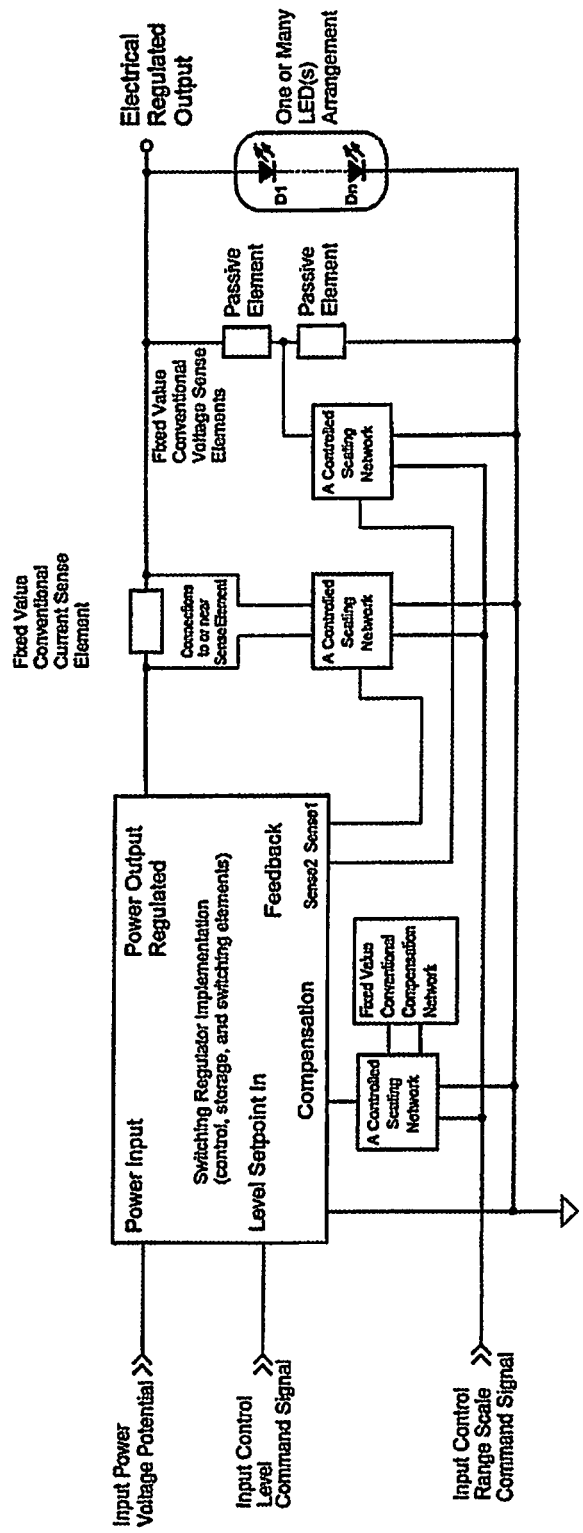
FIG. 2 is a schematic circuit diagram showing an LED power circuit as an example of a circuit employed in the light device of FIG. 1.

FIG. 2 shows an example switching circuit that can be employed to enable switching to burst mode. The circuit is as shown in FIG. 6 of U.S. Pat. No. 10,996,543, and a modified switching circuit is shown in FIG. 8 of that patent. The burst mode is achieved by scaling feedback signals that go to the power regulator of the LED light, and the structure and operation of the circuits are fully explained in the patent.

Figure 3:
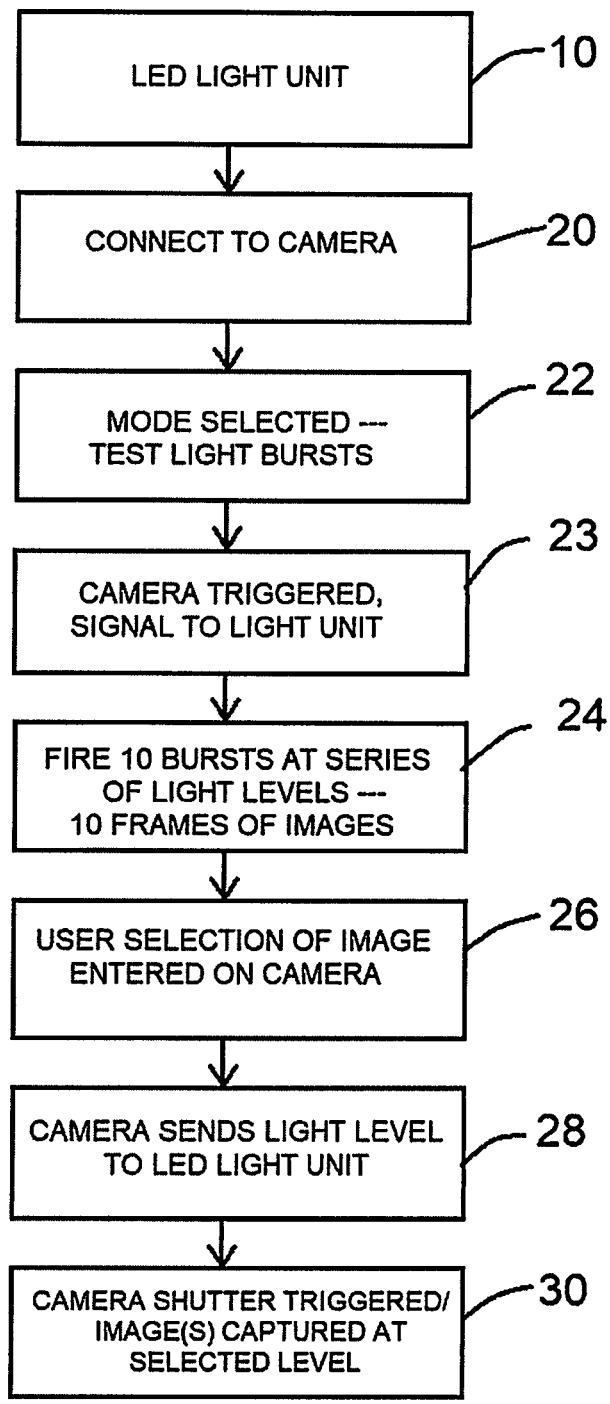
FIG. 3 is a simplified flow chart showing functions according to the invention, in one embodiment.

FIG. 3 shows functions of the camera and connected light unit, in a flow chart. The LED light unit 10 is connected to camera as noted in the block 20. The light unit receives a mode selection as noted at the block 22. After mode selection, the camera is triggered as noted at 23. In the block 24, the camera operates in test like burst mode by firing ten bursts (for example) at a series of different light levels. This will cause the camera to produce ten separate images illuminated at different light levels, and as noted at 26, the camera then receives an entry by the user with a selection of the best image. The camera receives that selection and sends the chosen light level to the LED light unit, as indicated at 28.

Finally, the camera shutter is triggered and the image is captured at the selected light level, noted in the block 30.

Figure 4:
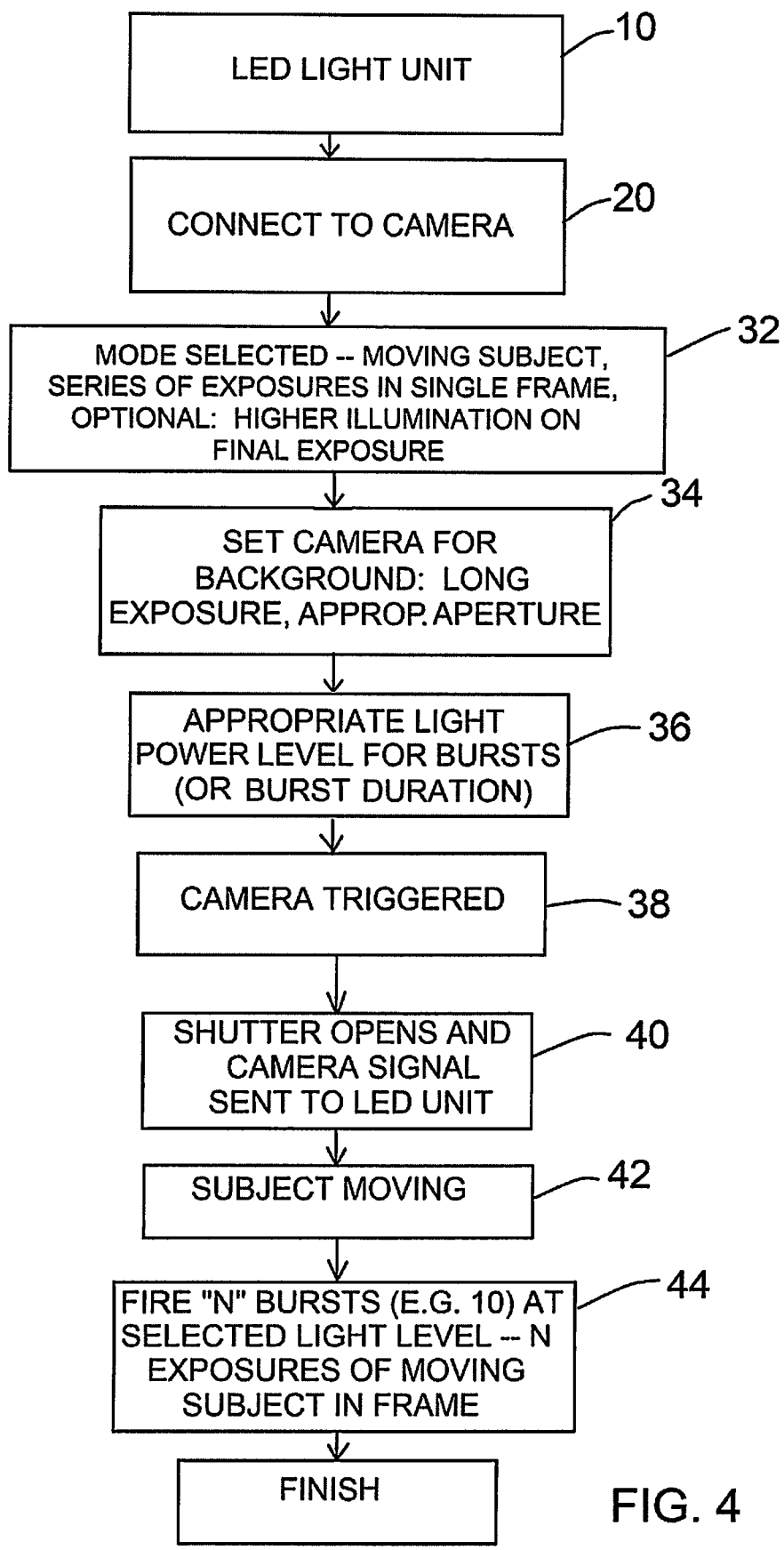
FIG. 4 is another flow chart showing another routine according to the invention.

FIG. 4 shows the invention in a different mode of operation. Here, the LED light unit and camera are used to produce a frame with multiple images of a moving subject. Again, the LED light unit 10 is connected to the camera 20. The light unit receives a mode selection at 32, the mode in this case being a series of exposures in a single frame. As noted, there can be an option to choose higher illumination for the final exposure. At the block 34, the camera receives a setting for a long exposure, which could be one second, two seconds, etc. As noted, the aperture setting on the camera is as appropriate. The background may be very dark, in which case the aperture or F-stop is not particularly relevant. On the other hand, there may be a background scene that is desired in the image, such as a bar setting, with someone dancing in the foreground. In that case the F-stop is set so that with the particular long exposure the background will be exposed correctly. This can be done through the camera, with a built-in light meter, or it could be a manual input from the user.

As noted in the block 36, the light level for the bursts from the LED light unit is selected. This could be by adjustment of power or by adjustment of duration of each burst. Note that the correct power level for the desired image could be determined by use of the procedure indicated in FIG. 3, prior to the routine shown here.

At the block 38, the camera receives a triggering input, and opens the shutter and sends a signal to the LED unit as noted at 40. The subject is moving, which movement may have commenced before the triggering of the shutter or just after (block 42). During the period of shutter opening, the LED light fires a preset ("N") number of bursts at the selected light level, producing "N" exposures of the moving subject in a single frame, as indicated in the block 44.

Figure 5:
FIG. 5 shows an example of an image that can be made with the invention, with multiple images of a moving subject at different positions within a single frame.

FIG. 5 shows an example of what can be produced using the procedure of FIG. 4 and the light unit and camera combination of the invention. A ballerina is shown over a long exposure with a series of bursts that produced still images at a series of separated locations. In the example in FIG. 5, the multiple images are "ghost" images except for the final image, which is shown as enhanced and fully exposed. This can preferably be achieved by a setting on the LED light unit 10 and indicated in the block 32 in FIG. 4, in which the final burst of light is of higher power or duration. FIG. 5 also shows that the background, i.e. the room and furnishings, is also exposed in this image. Images can also be made wherein the background is totally dark and F-stop is not a factor.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A method for operating a burst light source to obtain a photo image with a camera connected to the light source, comprising:
    providing a self-contained continuous/burst LED light source with regulating circuitry enabling the light source to be operated in a primary continuous lighting mode or, when selected, a burst mode with a much greater power output to the LED, and capable of a rapid series of bursts,
    the LED light source being connected to a camera such that signals from the camera will be sent to the light source to control the light source,
    operating the camera and the connected LED light source to produce light bursts for a series of consecutive images, at a rate of at least five bursts per second and at a sequence of different light illumination levels, with a gradation from a lowest burst of light to a highest burst of light, to produce a series of separate, similar images but with different levels of illumination of the subject,
    presenting the series of images with different illumination levels to a user and prompting the user to select a preferred image with a preferred light level,
    after the user selects an image from the series with an input to the camera, sending a signal from the camera to the LED light source to set the illumination level for an image to be taken, and
    taking an image of the subject with the illumination level setting as set by the camera.

2. The method of claim 1, wherein the sequence of bursts of light are at differing power levels.

3. The method of claim 1, wherein the sequence of bursts of light are at a same power level but different durations.

4. The method of claim 1, wherein the sequence of bursts is ten or more bursts.

5. The method of claim 1, wherein the sequence of bursts is at a rate of at least ten bursts per second.

6. The method of claim 1, further including, following the step of setting the illumination level, enabling the user to select a long-duration exposure for the camera shutter, and producing a sequence of images of a moving subject in a single frame by a series of bursts from the LED light source.

7. The method of claim 1, wherein the camera includes a hot shoe, and wherein the camera sends signals to the LED light source via a wireless trigger on the hot shoe, serving the connection of the LED light source to the camera.

8. The method of claim 6, wherein the LED light source produces bursts at a rate of at least ten per second.

9. A method for operating a burst light source to obtain a photo image with a camera connected to the light source, comprising:
    providing a self-contained continuous/burst LED light source with regulating circuitry enabling the light source to be operated in a primary continuous lighting mode or, when selected, a burst mode with a much greater power output to the LED, and capable of a rapid series of bursts,
    the LED light source being connected to a camera such that signals from the camera will be sent to the light source to control the light source,
    with the LED light source set to produce bursts, setting the camera at a selected long exposure, and
    with a subject in the image frame, tripping a camera trigger to open a shutter of the camera and to cause the LED light unit to produce rapid light bursts at a rate of at least five per second, for a series of exposures of the subject as the subject moves within a single image frame, such that a series of consecutive images of the moving subject are contained within the single image frame, each consecutive image being in a different position so as to indicate motion of the subject, while the background is correctly exposed in the image frame.

10. The method of claim 9, wherein the rapid light bursts are at a rate of at least ten per second.

11. The method of claim 9, wherein a background is to be included in the image frame, and wherein a lens opening of the camera is set to correctly expose the background.

12. The method of claim 9, wherein the LED light source is connected to the camera by a wireless trigger connected to a hot shoe on the camera, the wireless trigger sending signals to the LED light source.

13. The method of claim 9, wherein the long exposure is at least one second.

* * * * *